No. 684,697. Patented Oct. 15, 1901.
R. McA. LLOYD.
STORAGE BATTERY FOR BOATS.
(Application filed June 14, 1900.)
(No Model.)
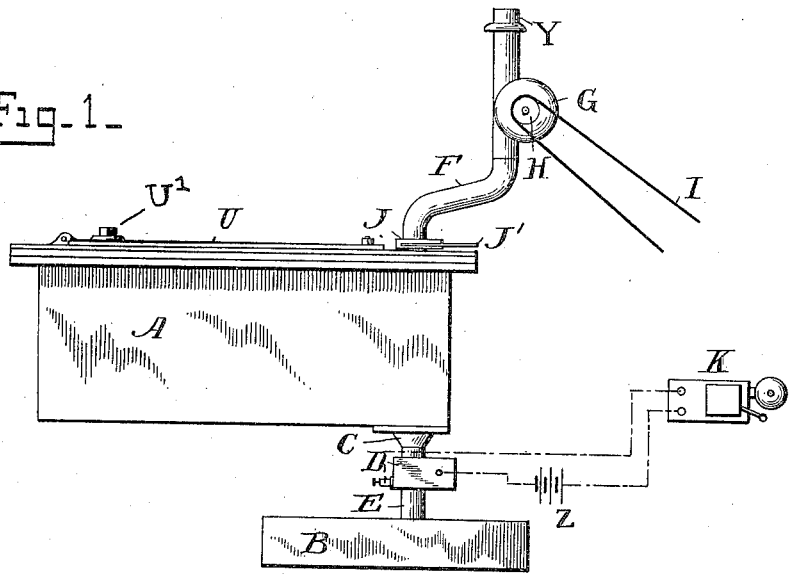
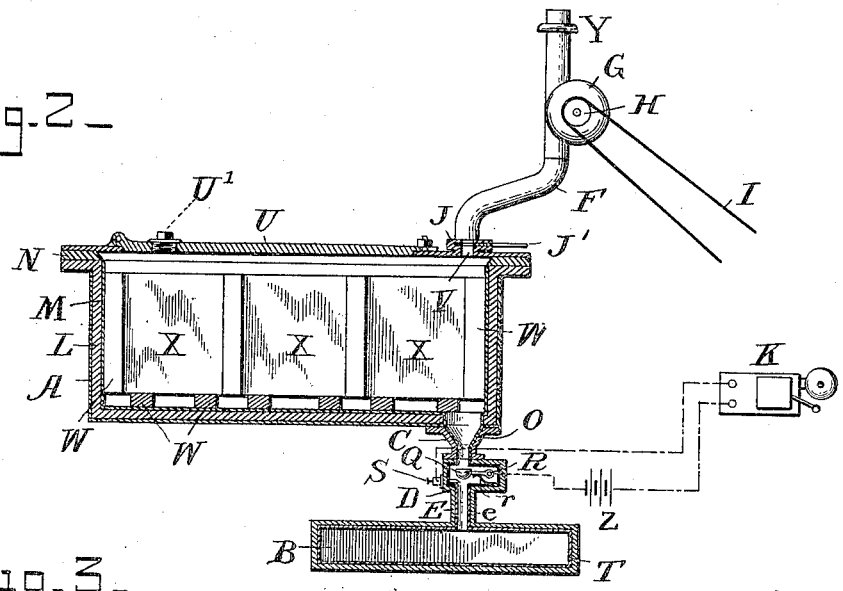
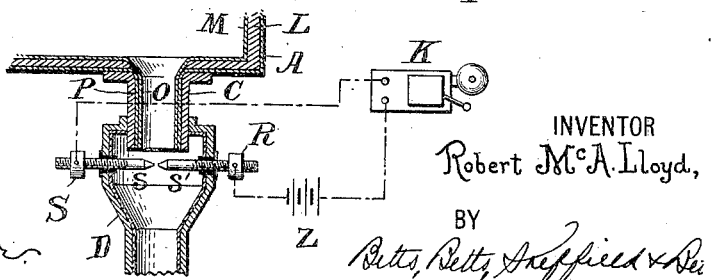
WITNESSES:
INVENTOR
Robert McA. Lloyd,
BY
ATTORNEYS.

UNITED STATES PATENT OFFICE.

ROBERT McA. LLOYD, OF NEW YORK, N. Y., ASSIGNOR TO THE ELECTRIC BOAT COMPANY, OF NEW YORK, N. Y., A CORPORATION OF NEW JERSEY.

STORAGE BATTERY FOR BOATS.

SPECIFICATION forming part of Letters Patent No. 684,697, dated October 15, 1901.

Application filed June 14, 1900. Serial No. 20,375. (No model.)

*To all whom it may concern:*

Be it known that I, ROBERT McA. LLOYD, a citizen of the United States, residing in the borough of Manhattan, city, county, and State of New York, have invented certain new and useful Improvements in Storage Batteries for Boats, &c., of which the following is a full and true description, reference being had to the accompanying drawings, showing one form of my invention.

The objects of my invention are, first, to thoroughly insulate the storage batteries from the machinery and from the hull of the boat or other body; second, to provide an acid-resisting battery-compartment for containing a plurality of batteries; third, to thoroughly insulate the said compartment; fourth, to provide an alarm or signal device for giving notice of the fact that a battery box or jar has broken and the battery solution is leaking or escaping; fifth, to provide an insulated acid-proof tank into which the leaking or escaping solution will collect, and, sixth, to provide means for ventilating the battery and especially for carrying off the gases generated while the batteries are being charged.

Referring to the accompanying drawings, Figure 1 is an exterior view of an arrangement of parts embodying my invention; and Fig. 2 is a partly-sectional view showing the construction of the battery-compartment, draining-box, and alarm-controlling device. Fig. 3 is a sectional view of another form of alarm-controlling device.

A is the acid-resisting battery-compartment.

B is the draining-box for collecting the battery solution overflowing from batteries in the battery-compartment or which has leaked or escaped therefrom.

C and E are pipes for conducting the leaking or escaping solution, preferably through an alarm device D.

The forms of battery-compartment and draining-box shown in the drawings are those preferred by me. Other suitable forms may of course be employed.

By preference the battery-compartment is composed of an outer box A, of steel or other metal, an interlining L, of wood or other non- conductive material, and an internal coating or lining of suitable acid-resisting material—as, for instance, a sheathing M of lead having its joints or meeting edges soldered or brazed.

N indicates wooden beams or boards over the upper edge of the steel box and between the said steel and the lead interlining.

O, Fig. 3, indicates an insulating-lining in the pipe C, and P indicates an interlining of acid-resisting material—a sheathing of lead, for instance—covering and protecting the same.

Q indicates a bowl or cup in the alarm-controlling device D, mounted on a pivotal pin R and held directly underneath the lower end of pipe C by a spring r, of strip-steel, rubber, or other suitable material.

S is a contact-screw extending through the side of D and with its inner end directly underneath the bowl Q, but out of contact therewith.

The pipe E, leading from the alarm-controlling device D to the draining-box B, is internally coated with a layer e of enamel or other insulating and acid-resisting material, and the draining-box B is also provided with an internal acid-resisting and insulating coating or lining T.

X X X indicate the battery-jars in the battery-box A. They may be of any suitable construction or material; but I prefer that they shall be of the construction described and shown in my pending application for patent, Serial No. 37,870, filed November 27, 1900, for improvement in storage batteries. The battery-jars are separated and insulated from each other and from the battery-compartment by strips W of wood or other suitable material.

The battery-compartment is provided with a cover (such as the hinged cover U) which may be clamped down upon the box and rendered air or gas tight in any usual manner.

In operation if the battery solution is spilled from a battery-jar or a jar has been broken or cracked the solution will collect in the bottom of the battery-box A and will run down through the pipe C and into the bowl or cup Q until the weight of the solution in said bowl overcomes the spring and the bowl touches the contact S. This closes an electric circuit, including an electric bell K and primary battery Z, and causes the bell to be continuously sounded, thereby giving an alarm.

Any other suitable combination of parts, electrically operated or otherwise, for controlling an audible or visible signal (when a battery-jar breaks, leaks, or overflows) may be employed. As an instance, the mechanism illustrated in Fig. 3 may be substituted for that already described. In that construction there are two metallic or other conductive pins $s$ and $s'$ extending horizontally through the side walls of D and having their inner extremities slightly separated immediately underneath the lower end of pipe C. The leaking or escaping battery solution comes down through the said pipe and falls between the points of the contacts $s$ and $s'$, closing the circuit through said contacts, through the battery Z, bell K, and the conductors.

The addition of an alarm device results in several advantages. One of these is that immediate notice is given when a battery-jar leaks or breaks and the attendant can discover and remedy the difficulty. When a battery-jar leaks or breaks, the level of the battery solution will come below the plates, permitting an arc to form between the plates, and there is grave liability that the gases in the battery will be exploded and the battery-box, and perhaps the boat itself, destroyed. This is especially true in the case of submarine boats, where the gases are confined within the closed hull and cannot escape.

During the charging of the battery gases are generated in and thrown off by the solution, and in view of the fact that these gases are deleterious to health (a very important consideration in submarine boats) and are explosive it is necessary to discharge them as speedily as possible outside of the hull.

In order to draw the gases from the battery-box A, I provide a pipe or tube F, leading from the interior of the battery-box to a point outside of the hull, and I also provide an exhaust-fan G (which may be driven by a pulley H and belt I) for causing a draft of air through the pipe and simultaneously drawing off any gases from the battery-compartment.

I provide means to assure a circulation of air through the battery-compartment while the gases are being drawn off. As shown, the cover U has an opening therein, with a screw-plug U' fitted therein. When the gases are to be drawn off, the plug is removed and the entering air facilitates the removal of the gases.

A plug Y may be fitted in the upper end of the pipe F when desired—as, for instance, when the boat is submerged—or any other suitable means for the same purpose may be employed.

A disk-valve J, provided at one end with a handle J', is pivoted to swing between the lower end of the pipe F and the top of the battery-compartment, so as to have an opening in the valve thrown into or out of register with an opening V in the top of the battery-box.

The improvements in storage batteries, comprising the combination, with an insulated acid-resisting tank or compartment, of means for draining off leaked or spilled battery solution and the combination, with a battery jar or compartment, especially when used in submarine boats, of means for drawing off gases are not claimed in this specification, but constitute the subject-matters of two applications, Serial Nos. 47,403 and 47,404, filed February 1, 1901, for Letters Patent of the United States. The preferred construction of battery box or jar is more especially described and claimed in an application, Serial No. 37,870, filed by me November 27, 1900, for Letters Patent of United States.

While I have herein shown and described preferred embodiments of my invention, yet I do not desire to be understood as confining myself to said embodiments, as obviously modifications will readily suggest themselves to skilled persons and still be within my invention.

What I claim is—

1. In combination with a battery-compartment, a compartment for collecting leaked or spilled battery solution, an open connection between the two compartments, and means, situated in the open connection, for giving warning of leaking or spilling, substantially as and for the purpose described.

2. In combination with a battery-compartment, an open connection for leading therefrom leaked or spilled battery solution, and means, situated in the open connection, and in position to be operated by the escaping solution, for giving warning of leaking or spilling, substantially as and for the purpose described.

3. In combination with a battery-compartment, an open connection for leading therefrom leaked or spilled battery solution, and a moving device, in position to be operated by the weight of leaked or spilled solution, for giving warning of leaking or spilling, substantially as and for the purpose described.

4. In combination with a battery-compartment, an open connection for leading therefrom leaked or spilled battery solution, a circuit-closer in position to be operated by the escaping solution and electrical conductors from the circuit-closer to an alarm and source of current, substantially as and for the purpose described.

5. In combination with a battery-compartment, a movable cup for receiving leaked or spilled battery solution, a circuit-closer in position to be operated by the cup, an electrically-controlled alarm, and electrical conductors from the circuit-closer to the alarm and source of current, substantially as and for the purpose described.

6. In combination with a battery-compartment, a compartment for collecting leaked or spilled battery solution, an open connection between the two compartments, an electrically-controlled alarm in position to be operated by leaked or spilled solution, and means for exhausting gases from the battery-compartment, substantially as and for the purpose described.

7. In combination with a battery-compartment provided with means for draining leaked or spilled battery solution, an alarm in position to be operated by leaked or spilled solution, and means for exhausting gases from the battery-compartment, substantially as and for the purpose described.

In witness whereof I have hereunto signed my name this 12th day of June, 1900.

ROBERT McA. LLOYD.

In presence of—
JAMES J. COSGROVE,
HECTOR H. HAVEMEYER.